(12) United States Patent
Nagarajan et al.

(10) Patent No.: US 12,007,913 B2
(45) Date of Patent: Jun. 11, 2024

(54) ON-CHIP INTERCONNECT FOR MEMORY CHANNEL CONTROLLERS

(71) Applicant: Google LLC, Mountain View, CA (US)

(72) Inventors: Rahul Nagarajan, Sunnyvale, CA (US); Hema Hariharan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/707,849

(22) Filed: Mar. 29, 2022

(65) Prior Publication Data

US 2022/0309011 A1  Sep. 29, 2022

Related U.S. Application Data

(60) Provisional application No. 63/167,593, filed on Mar. 29, 2021.

(51) Int. Cl.
*G06F 13/16* (2006.01)
*G06F 12/02* (2006.01)

(52) U.S. Cl.
CPC ...... *G06F 13/1668* (2013.01); *G06F 12/0238* (2013.01); *G06F 13/1621* (2013.01); *G06F 13/1642* (2013.01)

(58) Field of Classification Search
CPC ............. G06F 13/1668; G06F 12/0238; G06F 13/1621; G06F 13/1642; G06F 13/1631;

(Continued)

(56) References Cited

U.S. PATENT DOCUMENTS

2008/0082766 A1\* 4/2008 Okin .................. G06F 12/0893
711/E12.001
2009/0024833 A1 1/2009 Deneroff et al.
(Continued)

FOREIGN PATENT DOCUMENTS

| CN | 108874729 | 11/2018 |
|---|---|---|
| TW | 201908965 | 3/2019 |
| TW | I700641 | 8/2020 |

OTHER PUBLICATIONS

Gomony, Manil Dev, Benny Akesson, and Kees Goossens. "Architecture and optimal configuration of a real-time multi-channel memory controller." 2013 Design, Automation & Test in Europe Conference & Exhibition. IEEE, 2013. (Year: 2013).\*

(Continued)

*Primary Examiner* — Charles Rones
*Assistant Examiner* — Hewy H Li
(74) *Attorney, Agent, or Firm* — Fish & Richardson P.C.

(57) ABSTRACT

Methods, systems, and apparatus, including computer-readable media, are described for an integrated circuit that accelerates machine-learning computations. The circuit includes processor cores that each include: multiple channel controllers; an interface controller for coupling each channel controller to any memory channel of a system memory; and a fetch unit in each channel controller. Each fetch is configured to: receive channel data that encodes addressing information; obtain, based on the addressing information, data from any memory channel of the system memory using the interface controller; and write the obtained data to a vector memory of the processor core via the corresponding channel controller that includes the respective fetch unit.

20 Claims, 8 Drawing Sheets

(58) Field of Classification Search
CPC ............ G06F 13/1652; G06F 13/4022; G06F 15/173; G06F 15/8061; G06F 15/7846
See application file for complete search history.

(56) References Cited

U.S. PATENT DOCUMENTS

2015/0347338 A1* 12/2015 Shippy ................ G06F 13/4221
710/314
2021/0109577 A1* 4/2021 Mandava ............ G06F 13/1668

OTHER PUBLICATIONS

International Preliminary Report on Patentability in International Appln. No. PCT/US2022/022401, mailed on Oct. 12, 2023, 11 pages.
International Search Report and Written Opinion in International Appln. No. PCT/US2022/022401, mailed on Jul. 15, 2022, 16 pages.
Office Action in Taiwan Appln. No. 111111974, mailed on Sep. 28, 2023, 15 pages (English Translation).

* cited by examiner

```
rr_channels = []
start_channel = 0
increment = 1 for i in range (2048):
    for j in range (16):
        rr_channels.append ((start_channel + j) % 16)
    start_channel = (start_channel + increment) % 16
```

```
[[0, 1, 2, 3, 4, 5, 6, 7, 8, 9, 10, 11, 12, 13, 14, 15,
 10, 11, 12, 13, 14, 15, 1, 2, 3, 4, 5, 6, 7, 8, 9,
  5, 6, 7, 8, 9, 1, 2, 3, 4, 5, 6, 7, 8, 9, ....]
Channel [0]  Count : 2048 Median : 15.0 Average : 15.9926757812
Channel [1]  Count : 2048 Median : 15.0 Average : 15.9926757812
Channel [2]  Count : 2048 Median : 15.0 Average : 15.9926757812
Channel [3]  Count : 2048 Median : 15.0 Average : 15.9926757812
Channel [4]  Count : 2048 Median : 15.0 Average : 15.9926757812
Channel [5]  Count : 2048 Median : 15.0 Average : 15.9926757812
Channel [6]  Count : 2048 Median : 15.0 Average : 15.9926757812
Channel [7]  Count : 2048 Median : 15.0 Average : 15.9926757812
Channel [8]  Count : 2048 Median : 15.0 Average : 15.9926757812
Channel [9]  Count : 2048 Median : 15.0 Average : 15.9926757812
Channel [10] Count : 2048 Median : 15.0 Average : 15.9926757812
```

410

*Example allocation of Requests/IDs to Channels*

400

US 12,007,913 B2

ON-CHIP INTERCONNECT FOR MEMORY CHANNEL CONTROLLERS

CROSS-REFERENCE TO RELATED APPLICATIONS

This application claims the benefit of U.S. Provisional Application No. 63/167,593, filed on Mar. 29, 2021, which is incorporated herein by reference in its entirety.

This application is related to U.S. Provisional Application No. 63/001,216, filed Mar. 27, 2020. The contents of which are incorporated by reference herein.

This application is related to U.S. application Ser. No. 16/865,539, filed May 4, 2020. The contents of which are incorporated by reference herein.

BACKGROUND

This specification generally relates to using circuitry to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters.

Some neural networks are convolutional neural networks (CNNs) (e.g., for image processing) or recurrent neural networks (RNNs) (e.g., for speech and language processing). Each of these neural networks include respective sets of convolutional or recurrent neural network layers. A neural network layer can have an associated set of kernels as well as an embedding layer for processing inputs to generate sets of vectors for training a neural network. Kernels can be represented as a tensor, i.e., a multi-dimensional array, of weights. As an example, embedding layers can process a set of inputs, such as inputs of image pixel data or activation values generated by a neural network layer. The set of inputs or set of activation values can also be represented as a tensor.

SUMMARY

A distributed system can include memory for storing values that are accessed and used to perform an operation or to compute a value. Each value may be stored at a respective location in the memory that is identified by an address. The memory may be arranged to include different memory channels, where each channel includes a set of memory locations that are identified by a corresponding set of addresses. A channel controller is used to control and manage accesses to specific memory locations of a given memory channel to retrieve data specified by a request. More specifically, the channel controllers use communication channels of the distributed system to manage the flow of data to and from the memory.

Based on this context, techniques are described for implementing a hardware interface controller that is a shared interconnect or crossbar device configured to allow any channel controller of an integrated circuit to communicate with any memory channel of an example system memory. For example, the interface controller is configured to provide dynamic coupling of a given channel controller to various memory channels of a high bandwidth memory. The channel controllers may be included with the hardware architecture of the interface controller. The integrated circuit can be a hardware machine-learning accelerator or other special-purpose processor that includes multiple processor cores. The interface controller may be integrated in a processing pipeline of the accelerator's circuitry to enable each channel controller to read data from, and write data to, any channel of a high-bandwidth memory system.

One aspect of the subject matter described in this specification can be embodied in an integrated circuit configured to accelerate machine-learning computations. The circuit includes multiple processor cores and each processor core includes multiple channel controllers, an on-chip interconnect (OCI) interface configured to couple each of the multiple channel controllers to each memory channel of a system memory; and a respective fetch unit in each of the multiple channel controllers. The respective fetch unit is configured to: i) receive a request that encodes addressing information; ii) obtain, based on the addressing information, data from any memory channel of the system memory using the interface controller; and iii) write the data obtained from any memory channel to a vector memory of the processor core via the channel controller that includes the fetch unit.

These and other implementations can each optionally include one or more of the following features. For example, in some implementations, the interface controller has, or is operable to control, an intra-memory OCI node that includes: i) multiple read interfaces that are used to obtain data from any memory location along any memory channel of the system memory; and ii) multiple write interfaces that are used to write data to any memory location along any memory channel of the system memory.

In some implementations, the intra-memory OCI node includes: a first in, first out (FIFO) memory queue configured to store incoming OCI transaction requests during arbitration of an existing OCI transaction for: i) obtaining data from any memory location of the system memory or ii) writing data to any memory location of the system memory. In some implementations, the integrated circuit further includes an interface controller configured to: receive the request that encodes the addressing information; generate multiple control signals based on multiple IDs in the addressing information; and provide the multiple control signals to any memory channel of the system memory to fetch a data stored in a memory location of the system memory.

In some implementations, the addressing information is derived from one or more incoming OCI transaction requests received at the interface controller; and at least one existing OCI transaction request for accessing any memory location of the system memory was previously stored in the FIFO memory queue. The addressing information can be derived from the one or more incoming OCI transaction requests; and each incoming OCI transaction request can include multiple identifier's (IDs) corresponding to any set of memory locations across any memory channel of the system memory.

In some implementations, the OCI interface includes two or more addressing modes; and the interface controller is operable to generate control signals that allow for selecting between the two or more addressing modes of the OCI interface. A first addressing mode of the two or more addressing modes is a channel-interleaved mode that constrains a mapping of an embedding table relative to memory channels of the system memory. A second addressing mode of the two or more addressing modes is a stack-interleaved mode that expands the mapping of the embedding table relative to memory channels of the system memory.

In some implementations, each OCI transaction request is: received by the fetch unit; and processed, by the interface controller, to initiate accessing any memory location indicated in the OCI transaction request. In some implementations, each OCI transaction request for accessing data stored in the system memory encodes: i) a length in 32 Bytes corresponding to the data being accessed; ii) a TokenID that represents a source address specific to any memory location in system memory; and iii) a destination address of a memory location of the vector memory. In some implementations, the embedding table is split-up as multiple data shards that are allocated across memory channels of the entire system memory; and the interface controller selects the stack-interleaved mode to access any portion of the embedding table using any one of the multiple channel controllers.

The integrated circuit further includes: a respective flush unit in each of the multiple channel controllers, the respective flush unit being configured to: i) receive a request that encodes addressing information; ii) write, based on the addressing information, data from a source address in the vector memory to any memory location of the system memory using the interface controller. In some implementations, the machine-learning computations are performed to process neural network inputs through a neural network layer; and the flush unit is used to write parameters for the neural network layer to any memory location of the system memory using the interface controller.

Another aspect of the subject matter described in this specification can be embodied in a computer-implemented method performed using an integrated circuit configured to accelerate machine-learning computations. The integrated circuit includes a system memory and a processor core that includes multiple channel controllers, and the method includes: receiving multiple requests, where each of the multiple requests encodes addressing information. For a first request of the multiple requests, the method includes: identifying, based on addressing information of the first request, any memory location of any memory channel of the system memory; obtaining data from a memory location among any memory location of the system memory using an on-chip interconnect (OCI) interface that couples each of the channel controllers to each memory channel of the system memory; and writing, based on the addressing information of the first request, the data obtained from the memory location to a vector memory of the processor core.

These and other implementations can each optionally include one or more of the following features. For example, in some implementations, the OCI interface includes an intra-memory OCI node that includes multiple read interfaces and multiple write interfaces; and the method further includes: obtaining, based on control signals generated by an interface controller, data from any memory location along any memory channel of the system memory using the read interfaces; and writing, based on control signals generated by the interface controller, data to any memory location along any memory channel of the system memory using the write interfaces.

In some implementations, the intra-memory OCI node includes a first in, first out (FIFO) memory queue and the method includes: storing, at the FIFO memory queue, incoming OCI transaction requests during arbitration of an existing OCI transaction for: i) obtaining data from any memory location of the system memory or ii) writing data to any memory location of the system memory.

In some implementations, the method further includes: receiving, by the interface controller, the request that encodes the addressing information; generating, by the interface controller, multiple control signals based on multiple IDs in the addressing information; and providing, by the interface controller, the control signals to any memory channel of the system memory to fetch a data stored in a memory location of the system memory.

In some implementations, the addressing information is derived from one or more incoming OCI transaction requests received at the interface controller; and at least one existing OCI transaction request for accessing any memory location of the system memory was previously stored in the FIFO memory queue. In some implementations, the addressing information is derived from the one or more incoming OCI transaction requests; and each incoming OCI transaction request includes multiple identifier's (IDs) corresponding to any set of memory locations across any memory channel of the system memory.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages.

Circuitry for a crossbar/on-chip interconnect can be implemented at a special-purpose hardware circuit, such as a hardware accelerator used in a distributed system. The crossbar allows each channel controller to read data from, and write data to, any address location of a memory cell in any channel of a high-bandwidth memory system that communicates with a processor core or accelerator chip. This avoids the need to map channel controllers to specific memory channels, which can cause load imbalances that result in performance penalties. The crossbar is implemented to load-balance an allocation of addresses by assigning addresses to any channel controller for processing across all memory channels. Hence, the crossbar can improve performance in a distributed system relative to prior approaches.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 illustrates an example allocation of requests to different channel controllers.

Like reference numbers and designations in the various drawings indicate like elements.

DETAILED DESCRIPTION

Figure 1:
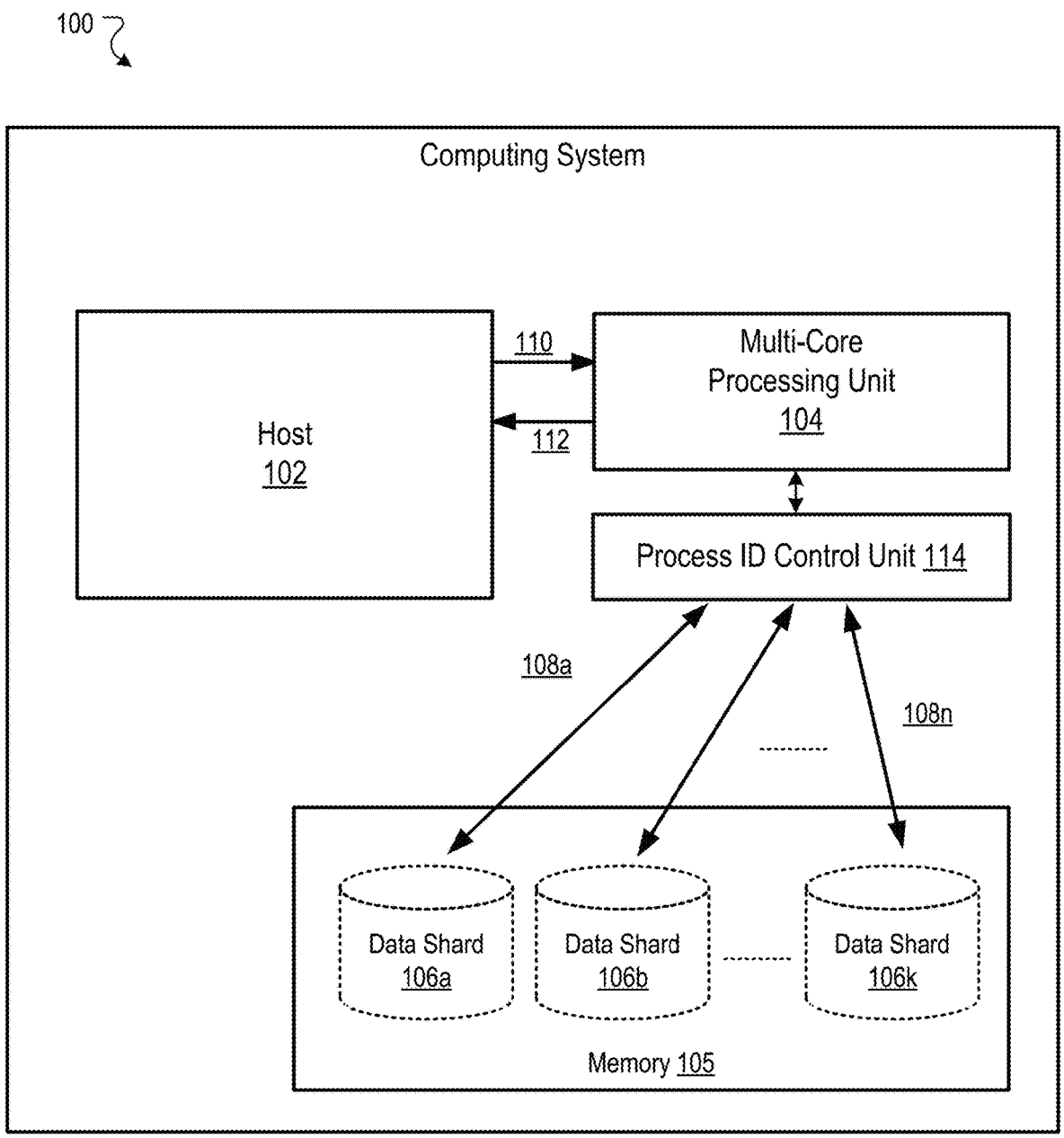
FIG. 1 is a block diagram of an example computing system.

FIG. 1 shows a block diagram of an example computing system 100 that is configured to retrieve data elements stored in a memory of system 100. The data elements can be retrieved and used to perform neural network computations for an example machine-learning workload. For example, the data elements can be processed to compute an output for a neural network layer or to perform embedding layer operations to generate sets of embeddings for training a neural network.

Embedding outputs are generated when a neural network of system 100 is trained to perform certain computational functions, such as computations related to machine translation, natural language understanding, ranking models, or content recommendation models. In some implementations, training the neural network involves updating a set of embeddings that were previously stored in an embedding table of the neural network, such as during a prior phase of training the neural network. For example, the embeddings of an embedding layer of a neural network may be trained jointly with the neural network for which the embeddings are to be used. Hence, the techniques described in this specification can be used to update embeddings during training of a neural network, with improved efficiency over prior approaches.

In general, an embedding layer of a neural network is used to embed features in a feature/embedding space corresponding to the embedding layer. An embedding vector can be a respective vector of numbers that is mapped to a corresponding feature in a set of features of a lookup table that represents an embedding layer. A feature can be an attribute or property that is shared by independent units on which analysis or prediction is to be performed. For example, the independent units can be groups of words in a vocabulary or image pixels that form parts of items such as images and other documents. An algorithm for training embeddings of an embedding layer can be executed by a neural network processor to map features to embedding vectors. In some implementations, embeddings of an embedding table are learned jointly with other layers of the neural network for which the embeddings are to be used. This type of learning occurs by back propagating gradients to update the embedding tables.

In other implementations, the embeddings may be learned separately from the other layers of the neural network for which the embeddings are to be used, such as when embeddings are pre-trained. For example, the algorithm can be used by the neural network processor to compute embeddings by processing information about discrete input features to determine a mapping or placement of similar inputs to embedding vectors that are geometrically close in the embedding space. In some cases, the process of computing embeddings can represent a technique for feature learning or feature engineering that allows a system to automatically discover representations needed for feature detection from raw input data.

In some implementations, a given "input" can have one or more features of one or more types, and the embedding layer generates a respective embedding for each of those types. For example, an input can be for a search query that has a few different feature types. The feature types can include properties of a user or user device (e.g., location, preferences, device type, etc.), query tokens, previously submitted queries, or other related types that may correspond to attributes of a search query. For any feature types that have more than one feature for a given input, a computing system is operable to retrieve the individual embeddings for each of those features. The system is also operable to combine the retrieved embeddings, e.g., by computing averages of the embedding values, to generate a final embedding for that feature type.

The computing system 100 includes a host 102, a multi-core processing unit 104, and a memory unit 105 ("memory 105"). The memory 105 includes data shards 106a-106k, where k is an integer greater than one. The memory 105 is described in more detail below. In general, the host 102 can be a processing unit, such as a processor, multiple processors, or multiple processor cores. Hence, the host 102 may include one or more processors, and is operable to generate or process an instruction for accessing a target dense matrix and to send an instruction 110 to the multi-core processing unit 104 to generate the target dense matrix. As described in more detail below, performing embedding layer operations can include transforming sparse elements from one or more matrices to generate a dense matrix.

The multi-core processing unit 104 accesses the corresponding elements 108a-108n from one or more of the data shards 106a-106k in memory 105, where n is an integer greater than one. The multi-core processing unit 104 generates the target dense matrix 112 using the corresponding elements 108a-108n, and provides the target dense matrix 112 to the host 102 for further processing. The multi-core processing unit 104 may generate the target dense matrix 112 by transforming each of the elements 108a-108n into a vector, and concatenating the n vectors into a single vector.

Generally, in the context of embeddings, 'sparse' information corresponding to the sparse elements may be a one-hot vector that identifies a feature value. For example, if there are five possible values for a given feature (e.g., A, B, C, D, E), the sparse vector would identify the feature value 'A' as (1, 0, 0, 0, 0) and the embedding layer would map (1, 0, 0, 0, 0) to a dense embedding vector for the feature value "A." In some implementations, during the training of an embedding layer to learn embeddings, the elements 108a-108n may be weight values of an embedding table that are transformed into a vector, such as an embedding vector for the feature value "B" or "C." The weight values may be transformed using a neural network processor of the multi-core processing unit 104 that executes a training algorithm to compute embeddings based at least on a mapping of features to embedding vectors.

The host 102 can process an instruction for updating a target dense matrix and sends an updated dense matrix to the multi-core processing unit 104. For example, a target dense matrix may correspond to an embedding of a neural network. Hence, the host 102 can process an instruction to update the embeddings to generate an updated dense matrix. For example, during a subsequent iteration of training a neural network to update embeddings a backward pass may be performed to update the embeddings by determining a new mapping of input features to embedding vectors and generating an updated dense matrix based on the new mapping. In some implementations, the multi-core processing unit 104 is operable to transform the updated dense matrix into corresponding sparse elements and to update one or more sparse elements (e.g., weights) stored in the data shards 106a-106k accordingly.

As indicated above, the host 102 is configured to process instructions for execution within the computing system 100. In some implementations, the host 102 is configured to process the target dense matrix 112 generated by the multi-core processing unit 104. In some other implementations, the host 102 may be configured to request the multi-core processing unit 104 to generate the target dense matrix 112, and another processing unit may be configured to process the target dense matrix 112.

Each processor of the multi-core processing unit 104 is configured to retrieve data elements stored in a memory of system 100. The memory can include multiple data shards 106a-106k that store data including elements 108a-108n. The data can include inputs, activations, gain values, or weight values corresponding to parameters or kernels of a matrix structure of weights. In some implementations, the data shards 106a-106k may be a volatile memory unit or units. In some other implementations, the data shards 106a-106k may be a non-volatile memory unit or units.

As used in this document, a data shard can include a memory bank, a memory cell, or a related section of memory, such as on-chip memory, high-bandwidth system memory, external memory, or a combination of these. The data shards 106a-106k may also be another form of computer-readable medium, such as devices in a storage area network or other configurations. The data shards 106a-106k may be coupled to the multi-core processing unit 104 using electrical connections, optical connections, or wireless connections. In some implementations, the data shards 106a-106k may be part of the multi-core processing unit 104 and based on a Processor-in-memory (PIM) architecture.

The multi-core processing unit 104 is configured to determine a dense matrix based on sparse elements. The multi-core processing unit 104 includes multiple interconnected processors or processor cores. For example, the multi-core processing unit 104 can be a distributed processing system that includes multiple interconnected processor cores. In general, the terms "processor" and "processor core" may be used interchangeably to describe discrete interconnected processing resources of the multi-core processing unit 104.

The system 100 also includes a process ID control unit 114 ("control unit 114"). The control unit 114 receives a set of ID headers and performs operations to dispatch the ID headers or to dispatch portions of information included in the ID headers. The ID headers are dispatched to channel controllers, which are described in more detail below with reference to FIG. 2. In some implementations, the system 100 includes multiple control units 114. For example, the system 100 can include a control unit 114 for each processor or processor core at the system 100. Each of the control units 114 that are coupled to a processor/core of the multi-core processing unit 104 receives a set of ID headers from a source. The source can be the host 102 or another processor of the multi-core processing unit 104.

An ID header can represent a request that includes information specifying addresses for memory locations in the memory 105. The memory 105 can represent a high-bandwidth memory (HBM) or an input/output (I/O) device that exchanges data communications with a control unit 114 in a processor core of an example hardware circuit included at system 100. For example, the memory 105 may exchange data communications with a processor core of the multi-core processing unit 104 to pass inputs to the core and to receive outputs generated by one or more computing resources of the core. The inputs and data values stored in, or written to, memory locations of memory 105 can represent vector elements or arrays of vector values.

The memory 105 can be dynamic random access memory (DRAM) assets of system 100. In some implementations, memory 105 is an external or off-chip memory relative to an example hardware circuit that includes one or more processors or processor cores. The memory 105 is configured to exchange data communications with on-chip resources of the hardware circuit, such as a vector processing unit (VPU) or vector memory banks of the VPU (described below). For example, memory 105 can be disposed at a physical location that is outside of an integrated circuit die that represents a hardware circuit of system 100. Hence, memory 105 can be distant or non-local relative to computing resources disposed within the integrated circuit die. Alternatively, memory 105, or portions of its resources, can be disposed within the integrated circuit die representing a special-purpose hardware circuit, such that the memory 105 is local to or co-located with computing resources of the circuit.

Figure 2:
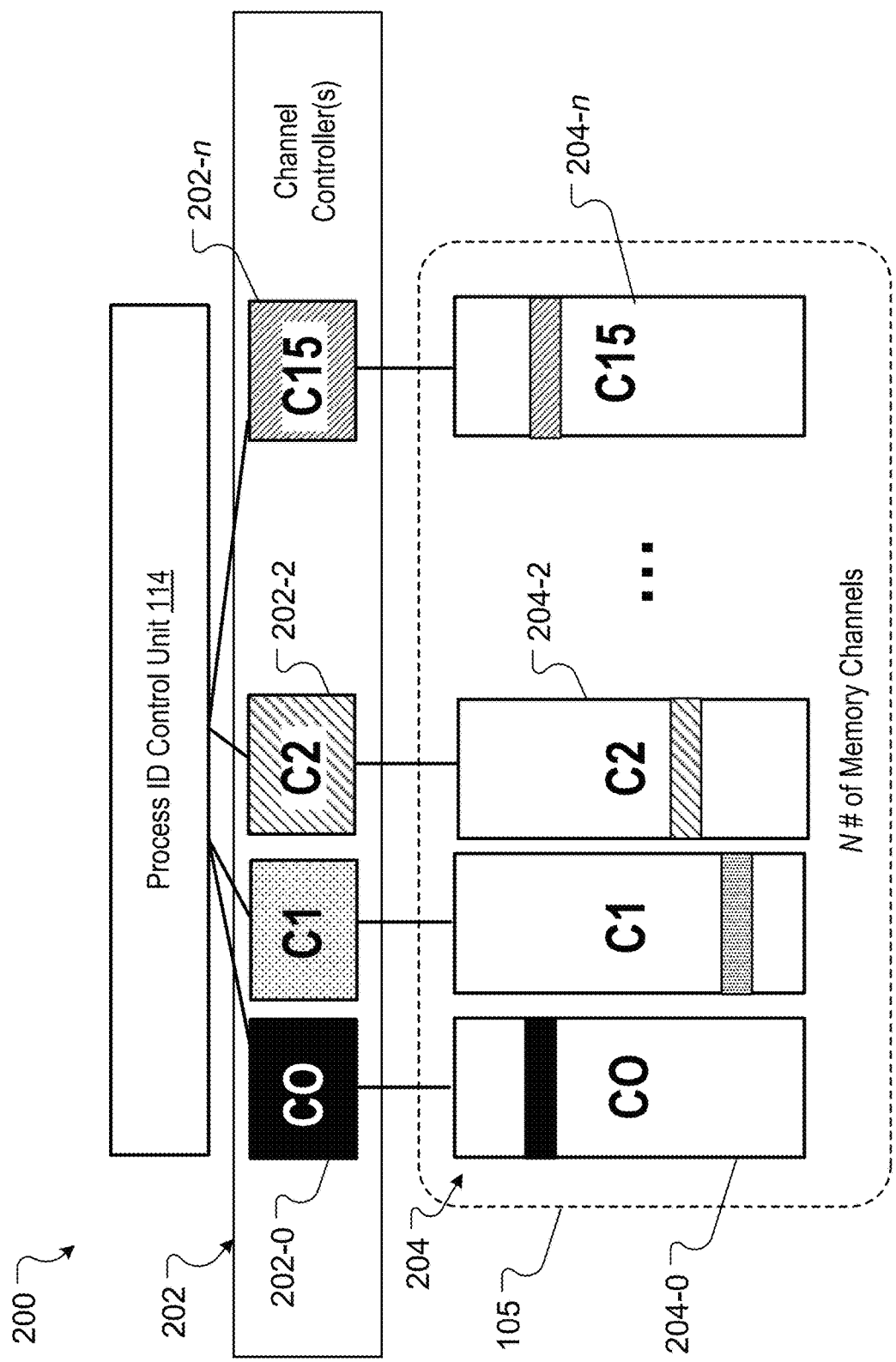
FIG. 2 is a block diagram of an architecture that includes examples of a control unit, channel controllers, and memory channels.

FIG. 2 is a block diagram of an architecture 200 that includes examples of channel controllers 202 and memory channels 204 of memory 105, as well as the control unit 114 described above. Each of the memory channels 204 can represent a memory bank of memory 105, a set of memory banks of memory 105, a set of memory locations of memory 105, or combinations of these.

A set of channel controllers 202 includes multiple respective channel controllers that are indicated at least as C0, C1, C2, and C15. In the example of FIG. 2 architecture 200 can include 16 channel controllers. In some implementations, architecture 200 includes more or few channel controllers. For example, the architecture 200 can include N number of channel controllers as well as N number of memory channels 204. These aspects of the architecture 200 are indicated by reference number 202-n, with respect to an individual channel controller, and by reference number 204-n, with respect to an individual memory channel.

The implementation of FIG. 2 shows an example where individual channel controllers, such as channel controllers 202-0 (C0) and 202-2 (C2), are hard mapped to specific corresponding memory channels, such as memory channels 204-0 (C0) and 204-2 (C2), respectively. As discussed above, a system memory 105 with channel controllers 202 that are hard mapped to specific memory channels can experience load imbalances. These load imbalances can stall or substantially delay operations for neural network computes performed at system 100, such as operations for generating an output for an embedding layer.

This prior approach of mapping specific channel controllers 202 to a particular memory channel can have other challenges. For example, the approach can have a constraint of requiring data be stored in a manner that is sensitive to how the addresses and data are mapped to specific channel controllers 202. Additionally, the approach can be inefficient when a system is required to perform a large number of randomized look ups to retrieve vectors from a large space in memory. To address these challenges, an on-chip interconnect (OCI), or crossbar, (described below) is integrated at a special-purpose hardware circuit. The crossbar may be integrated in a processing pipeline of the accelerator's circuitry to enable each channel controller to read data from, and write data to, any channel of a high-bandwidth memory system.

In some implementations, the special-purpose circuit is a multi-core hardware accelerator and the OCI is a channel controller interface that is uniquely configured at least based on the multi-core structure of the hardware accelerator. For example, the channel controller interface is configured to allow communication between each core of the multi-core hardware accelerator and each memory channel of memory 105, including different types of memory structures that correspond to the memory channels.

The channel controller interface can be sized to 32 B×4 instead of 128 B×1. Based on this example sizing, the channel controller interface can include multiple independent transaction threads between the memory 105 and channel controllers 202, without requiring extraneous ports for the OCI hardware. In some implementations, the channel controller interface is configured to efficiently handle dynamic bandwidth requirements at each channel and for different phases of compute. For example, the gigabyte per second (GBps) bandwidth requirements can vary for different computes for different access sizes, e.g., 32 Byte (32 B) access, 64 Byte (64 B) access, 128 Byte (128 B) access. The phases can include forward pass compute, backward pass compute, and backward pass compute that implements optimization algorithms such as Adagrad to update learned values of a particular vector based on gradients produced from evaluating a neural network on some training data.

The channel controller interface can be uniquely configured to include multiple node interfaces. For example, the crossbar can include: i) an intra-client node interface operable to carry direct memory access (DMA) descriptors and control messages; ii) an intra-memory node interface operable to carry read/write commands and data for various memory structures of the memory system (e.g., buffer memory, instruction memory, shared memory, vector memory, host memory); iii) an intra-processor node interface (lower) that is operable to carry load/store traffic from a first/lower set of channel controllers 202 to the memory 105; and iv) an intra-processor node interface (upper) that is operable to carry load/store traffic from a second/upper set of channel controllers 202 to the memory 105. This is described in more detail below at least with reference to FIGS. 5A and 5B.

The channel controller interface allows sets of channel controllers to access any memory channel/address of memory 105. But, even when addresses specified in requests are spread among a set of channel controllers 202, the large scale execution of certain machine-learning workloads can exhibit data access patterns that result in a particular channel controller receiving a bulk of the data processing load relative to other channel controllers. In the example of FIG. 2, channel controller 202-0 demonstrates an imbalance in which that channel receives a bulk of the data processing load relative to other channel controllers (e.g., C1, C2). To address this challenge, the crossbar is used to implement a specific control scheme to control the allocations of addresses or requests to each channel controller 202. The control scheme causes addresses to be allocated substantially equally among the channel controllers 202. This is described in more detail below with reference to FIG. 3.

Figure 3:
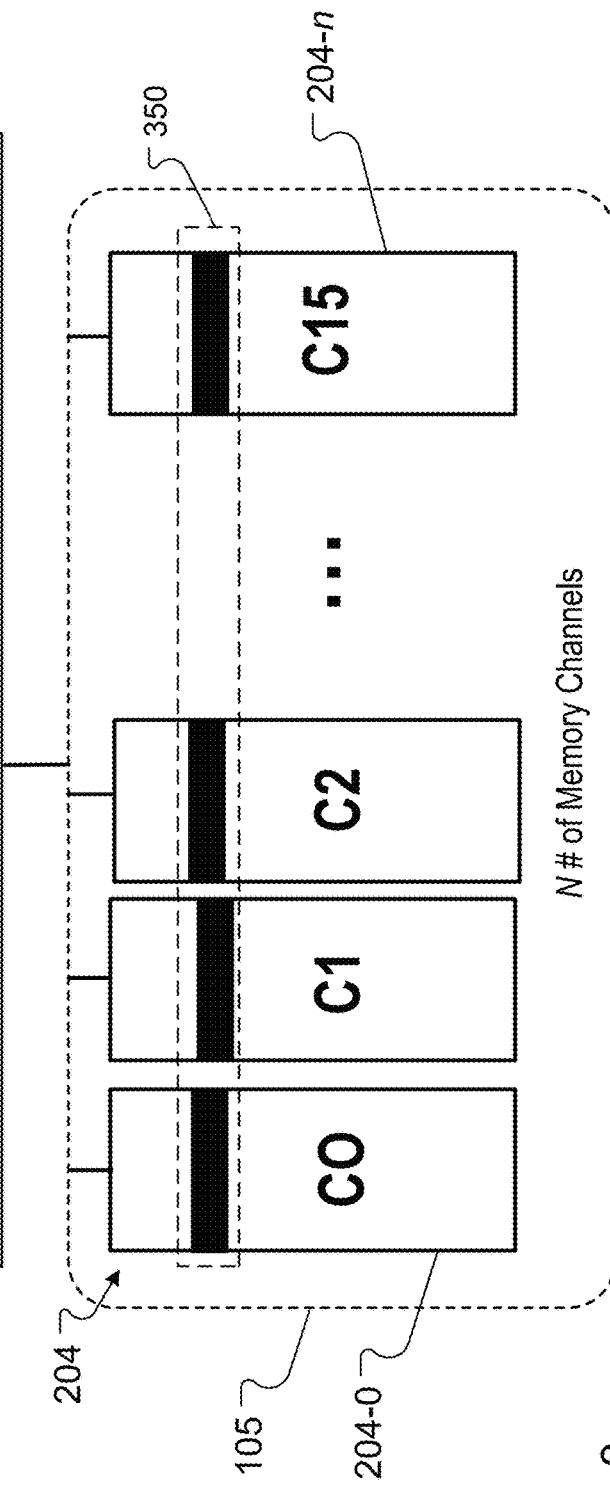
FIG. 3 illustrates an example algorithm used to implement load balancing for memory channel controllers.

FIG. 3 illustrates an example algorithm 300 used to implement load balancing for the memory channel controllers 202.

As indicated above, data accesses for an example machine-learning workload can exhibit certain pathological patterns. For example, even though a set requests and addresses may be spread generally across the channel controllers 202, certain patterns may be present in which a particular channel controller is required to operate on a substantial number of larger features or large vectors. Such patterns can cause the control unit 114 to dispatch a set of processing tasks or ID headers that still result in a load imbalance at the channel controllers 202. For example, the patterns may have a bursty property that cause them to appear for certain short time windows of processing, such as between 20 and 100 cycles. The load imbalance can occur even though any one of the channel controllers 202 is configured to access any memory location and any memory channel 204 of the memory 105.

The algorithm 300 corresponds to the control scheme noted above and is an example dispatch algorithm that is used to implement load balancing for the memory channel controllers 202 of system 100. The algorithm 300 can include pseudo-code as shown in the example of FIG. 3, which represents one or more of the instructional steps of the dispatch algorithm 300. In some implementations, the algorithm 300 is a modified round-robin dispatch algorithm. The modified round-robin attributes of the dispatch algorithm 300 allows a set of ID headers to be parsed and dispatched to the channel controllers 202.

For example, the modified round-robin dispatch algorithm 300 is configured to disrupt or inhibit latent pathological sequences that can occur during data accesses for a machine-learning workload. Because of this, the modified round-robin dispatch algorithm 300 is configured to allow allocations of ID headers (e.g., address of activations or gradients) in a manner that is load balanced across each channel controller 202 in a set of channel controllers (350). A standard round-robin approach for scheduling a process indicates to select a channel controller in a simple, circular order in which selections are performed without priority.

To address the bursty patterns discussed above, the round-robin approach can be adapted or modified to first detect an initial completion of a first circular order of selections. In response to detecting the initial completion, the control unit 114 can then adjust an increment parameter to modify the initial channel controller that is selected for a second or subsequent circular round of selections.

For example, the system 100 can include 16 channel controllers (e.g., CC0-CC15). The control unit 114 can select each channel controller 202 during an initial round and detect completion of the initial round based on a count parameter that indicates CC15 has been selected during that round. The count parameter can correspond to the total number of channel controllers (16) such that selection of CC15 during the initial round indicates selection of each of the 16 channel controllers. The control unit 114 can then adjust the value of an increment parameter to bypass selection of a particular channel controller.

For example, the control unit 114 can increase the increment parameter to bypass selection of CC0 and select CC1 at the start of a subsequent round of channel selections. Likewise, the control unit 114 can again increase the increment parameter to bypass selection of CC1 and select CC2 at the start of another subsequent round of channel selections. In some implementations, the control unit 114 can periodically adjust the value of the increment parameter to increase (or decrease) an increment of the channel count based on one or more observed data access patterns, as described in more detail below with reference to FIG. 4.

FIG. 4 illustrates a table 400 that shows an example sequence 410 for selecting channel controllers 202 to effect a balanced allocation of requests to different channel controllers 202.

As described briefly above, a native round-robin scheme can suffer from pathological patterns in input data being accessed for a computation. For example, a pattern can be that every 16th ID header will belong to an embedding table that has the longest embedding vectors and most compute intensive optimizer. The example pattern can cause load imbalance even in the native round-robin scheme. The control unit 114 can be a hardware component of a processor core that executes instructions corresponding to the dispatch algorithm 300 to implement a modified round-robin ID header dispatch scheme.

Based on the algorithm 300, this dispatch scheme is operable to reduce a probability of load imbalance due to pathological patterns in a set of input data. The algorithm 300 can be used to generate the example sequence 410 for selecting channel controllers 202. Each number in the sequence indicates a channel controller to be selected. In some implementations, the sequence 410 can initially iterate through each channel controller in a set (e.g., 0 through 15) based on an initial unmodified round-robin flow.

After an initial iteration in which each channel controller is selected, the round-robin flow can be modified to select channel controller CC1 rather than beginning again with selection of channel controller CC0. Likewise, after a second iteration in which each channel controller is selected, the round-robin flow can be modified to select channel controller CC2 rather than beginning again with selection of channel controller CC1. This modified selection scheme provides an example of how each channel controller in a set can be selected by the control unit 114 to allow for equal, or substantially equal, distribution of addresses among the set. In some implementations, the system 100 monitors data access patterns for each channel controller and dynamically adjusts or modifies the dispatch schemes based on the observed patterns.

The control unit 114 uses the modified dispatch schemes to generate a set of channel numbers for a set of channel controllers 202. The generated set of channel numbers are processed at the control unit 114 to forward ID headers to corresponding channel controllers 204. In some implementations, the control unit 114 forwards the ID headers to corresponding channel controllers 204 based on the example sequence 410, which is derived from the modified dispatch scheme. To ensure sufficient load-balancing of processing workloads for ID headers across the channel controllers 202, the algorithm 300 causes the control unit 114 to implement certain properties for selection of the channel numbers. In some implementations, algorithm 300 is used for channel selection based on the example steps of the pseudo-code shown at FIG. 3.

For example, the channel selection properties requires that generation of the channel numbers be fair and non-bursty. The "fair" property for generating the channel numbers causes (or requires) all channel controllers to be selected equally or substantially equally for a given machine-learning task. The "non-bursty" property for generating the channel numbers causes (or requires) the channel controllers to be selected without intermittent increases in repeated selection of a particular channel controller for a given machine-learning task. For example, a channel number sequence of "0, 1, 0, 1, 4, 5, 0, . . . " is not a desirable pattern and would not satisfy the "non-bursty" property for generating the channel numbers.

An example set of metrics can used to determine whether each of the above properties (e.g., fair and non-bursty) are satisfied. The metrics include determining a count, a mean (average), and a median with respect to the number of times a channel number appears for selection. For the "count" metric, the system 100 is operable to determine a count of the number of times a channel or channel number is included per processing iteration. The number of times should be the same for all the channels 202 or channel controllers 202. If the system 100 determines that the number of times is not the same, the system 100 can detect that a particular pattern of channel controller selection is biased and not load-balanced for a given set of operations.

For the "mean" metric, the system 100 is operable to determine, for each channel number, whether the number of times a channel number appears for selection converges to N after a threshold number of iterations, where N is an integer greater than or equal to one. For example, if the system 100 includes 16 channel controllers, then the system 100 is operable to determine, for each channel number, whether the number of times a channel number appears for selection converges to 16 after a threshold number of iterations or ID headers. In some implementations, the threshold number of iterations varies based on the size and complexity of the data being retrieved and operated on.

The "median" metric indicates a burstiness of a particular channel controller. For example, if the system 100 determines that a channel controller 204-$n$ has a low median selection value then it will receive more ID headers in a burst relative to other channel controllers, which can indicate an imbalance. The table 400 includes sample metric values for each channel number for an example processing iteration that was run for a threshold 2048 ID headers. As noted earlier, the system 100 can monitor data access patterns for each channel controller, relative to the metrics and properties discussed above, and dynamically adjust or modify the dispatch/control schemes based on the observed patterns. For example, the control unit 114 can periodically adjust the value of the increment parameter to increase (or decrease) an increment of the channel count based on the data access patterns.

Figure 5A:
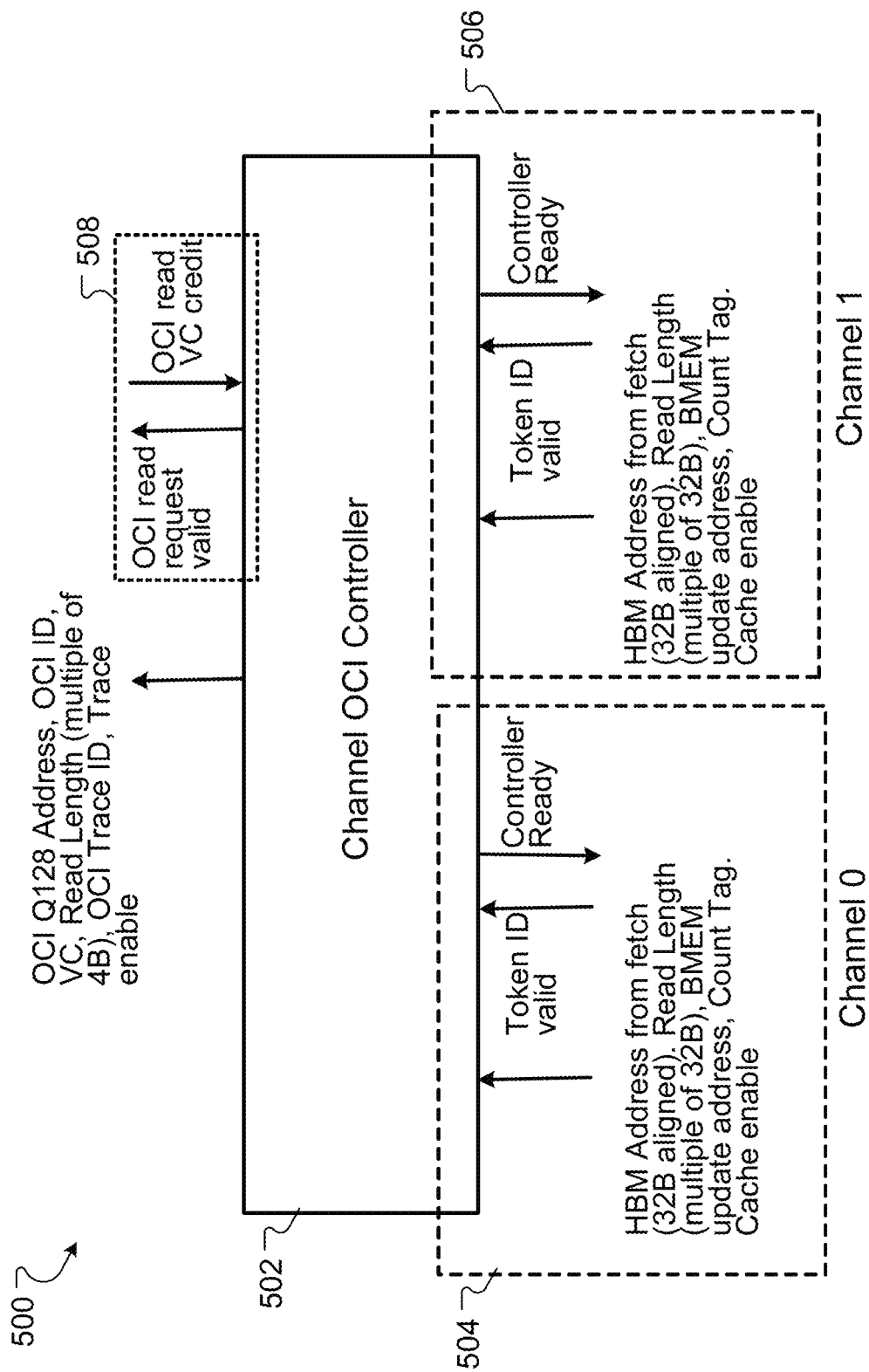
FIGS. 5A and 5B show an example OCI interface controller.
Figure 5B:
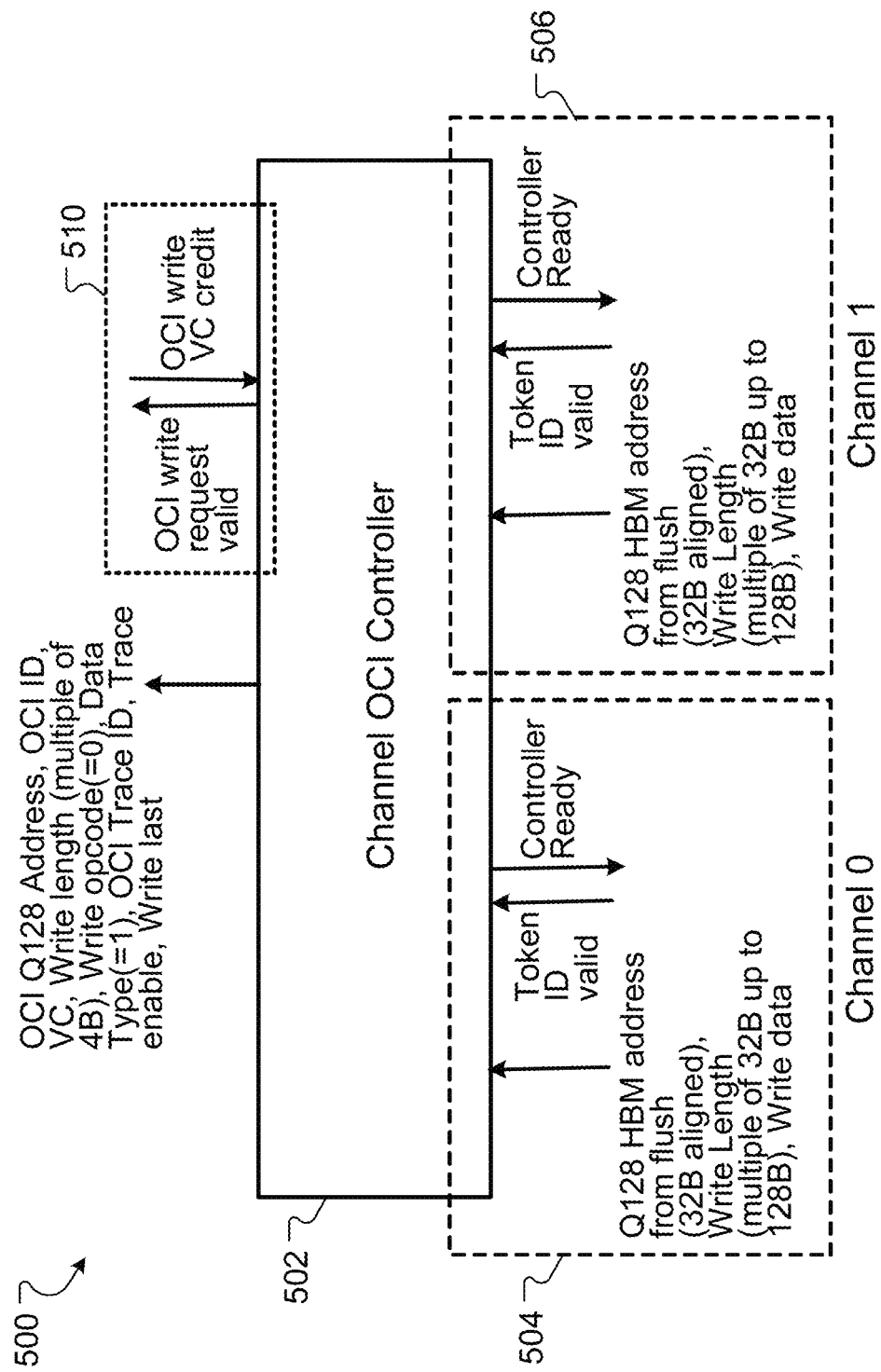

FIGS. 5A and 5B show an example OCI interface 500 that includes a channel OCI controller 502 that manages or controls operations associated with an OCI fabric (or architecture) of system 100. System 100 (and OCI interface 500) can include multiple OCI controllers 502. In some implementations, OCI controller 502 corresponds to a respective channel controllers 202 described above. In some other implementations, OCI controller 502 is distinct from the respective channel controllers 202 described above. The OCI controller 502 is an interface controller that is operable to control an OCI interface 500, including nodes and read or write interfaces of the OCI interface. In some implementations, one or more features of the OCI interface 500 are included in the interface controller and/or may be controllable by the interface controller.

The OCI interface 500 can be a network node of an integrated circuit that includes multiple chips, where each chip can represent a processor, processor core, or hardware accelerator. For example, the OCI interface 500 may be comprised of multiple sub-network nodes that cooperate to couple or interconnect each chip of the integrated circuit, such that data obtained via one chip can be routed, via the network node, to another chip.

In general, controller 502 controls operations associated with one or more interface devices of an OCI interface of system 100. The OCI interface 500 can include a respective 32B random access load/store interface from each channel controller and can support multiple threads (e.g., eight threads) of efficient 32B read/write access into memory 105 per memory channel. Controller 502 is configured to reorder one or more incoming responses from memory 105 to update a fetch or flush unit of a given channel controller. This is described in more detail below.

In some implementations, the OCI interface includes 4×32 B read and write interface per channel 504, 506. These read and write interfaces can represent intra processor OCI nodes, with each node serving two channels 504, 506, or channel controllers that correspond to channels 504 and 506. The example of FIG. 5A shows a read operation associated with the read interface 508, whereas the example of FIG. 5B shows a write operation associated with the write interface 510. The 4×32 B configuration of the OCI interface 500 allows for independent transaction threads to occur between memory 105 and the channel controllers. For example, as noted above, the OCI interface 500 can be sized to 32 B×4 instead of 128B×1. Based on this example sizing, the OCI interface 500 can include multiple independent transaction threads between the memory 105 and channel controllers 202, without requiring extraneous ports for the OCI hardware.

The OCI interface 500 is configured to issue channel credits that are maintained per data interface. In some implementations, each data interface corresponds to a subnetwork or node of the OCI interface 500. The controller 502 can generate one or more control signals that correspond to each channel credit. For example, the controller 502 can generate control signals based on a various IDs in addressing information encoded in an OCI transaction request. The controller 502 can also provide or route the control signals to any memory channel of the system memory to fetch a data stored in a memory location of the system memory.

In some implementations, each node of OCI interface 500 services two channel controllers and the credits on this interface node are shared between the two channel controllers. Unlike a single 128 B interface that can cause a lightly loaded channel controller to see long latencies in its transactions when other channel controllers are busy, with the 4×32 B configuration of the OCI interface 500, such an interdependence exists primarily (or only) between two channels that are arbitrating for the same port.

The channel controller to OCI interface mapping can be fixed or dynamic. In implementations where the mapping is fixed, it may be possible for one port to be busy while others are idle for short periods of time, but the overall configuration allows for a distribution of IDs such that all ports are utilized equally well.

The OCI interface 500 can include at least two interfaces that interact with a direct memory access (DMA) unit of system 100 that handles bulk transfers and control messages for a given processor core. For example, the DMA unit interacts with at least two OCI interfaces, a DMA client interface and a DMA memory interface. The DMA client interface is a bulk data movement interface for BMEM, BIMEM, SMEM, VIMEM and HMF and includes a descriptor sub-interface that sends descriptors to the OCI Node and a message sub-interface that is used for control messages relating to sync flags and interrupt operations. The DMA memory interface handles the read and write requests from the OCI and includes a read sub-interface and a write sub-interface. The read sub-interface receives read commands from the controller 502 of the OCI interface 500 and sends a response back on a 128 byte data interface. The write sub-interface receives write commands and writes data on a 128 byte interface.

BMEM is a vector memory structure for storing vectors of data, whereas SMEM is a scalar memory structure for storing scalar data values. BIMEM is a processor core instruction memory, whereas VIMEM is a vector instruction memory (vimem) that stores a program that is executed by an address handler VPU unit. In some implementations, the VIMEM across the 16 channel controllers are treated as (or configured as) one large sequential memory by the DMA unit of system 100.

In some cases, the read and write interfaces of the OCI interface 500 are part of an intra-memory OCI node of system 100. This node or unit can include an input first in, first out (FIFO) memory queue (or buffer) that stores an incoming OCI transaction while different memory blocks/stacks are being arbitrated for write-to or read-from operations. In some implementations, one or more of the incoming OCI transaction requests that are processed during an existing operation were previously stored in the FIFO memory queue as a step in arbitrating a set of operations.

This input FIFO can be sized based on a worst case BMEM access latency. In some implementations, the FIFO is sized in this manner even though the BMEM access latency may not be the slowest memory. This is because memories other than BMEM may only be accessed at the start of a batch, so any performance penalty on the OCI interface 500 as a result of these accesses will be suffered only one time.

Memory 105 (e.g., an HBM) can include four HBM stacks that are interleaved at 64 byte granularity. For example, memory 105 can include HBM Stack 0 being interleaved at bytes [0-63] [128-191], HBM Stack 1 being interleaved at Bytes [64-127] [192-255], HBM Stack 2 being interleaved at Bytes [256-319][384-447], and HBM Stack 3 being interleaved at Bytes [320-383][448-511]. In some implementations, the memory 105 can include more or fewer stacks and various byte granularities. With respect to the 64 byte granularity, when 128 Bytes are accessed from HBM stack 0, that stack will return data stored at memory locations corresponding to Bytes [0-63] [128-191]. This can represent an example Q128 addressing mode on the OCI fabric.

An OCI controller 502 of an example processor core can cause the core to operate in a channel-interleaved mode or stack-interleaved mode. Each of the channel-interleaved mode and the stack-interleaved mode represents an example addressing mode of the processor core. The channel interleaved addressing mode can map an embedding table to a single HBM stack that is closest to the processor core, such that all memory accesses are made to the closest HBM stack which provides a smaller latency relative to another HBM stack.

In the stack-interleaved mode, an embedding table can be split across all of the high-bandwidth memory (HBM) stacks (e.g., of memory 105) on a chip to make use of different system addressing schemes. For example, during the stack-interleaved mode the embedding table can be accessed using the same address scheme as the rest of the system 100 and the software controls of the system 100 can be configured to use an entire capacity of memory 105, even if it chooses to use fewer processing cores on an integrated circuit chip that includes multiple cores.

In some implementations, a channel controller of system 100 includes at least two (and optionally three) processing stages: fetch, compute, and flush (optionally). This can be an in-order processing pipeline that processes the channel IDs in FIFO order.

The fetch processes are implemented using a fetch ID unit, such as fetch ID unit 702 (or 704) discussed below with reference to FIG. 7. In some implementations, the fetch ID unit is the first processing stage in a channel controller pipeline. The fetch ID unit receives the channel ID data structure from the processer core ID unit 114. The channel ID data encodes a length of the data to be retrieved (in 32

Bytes), a TokenID (e.g., a source address of memory 105), and the BMEM destination address. The fetch ID unit is used to load data from memory 105 and to store the obtained data to a BMEM address specified in the channel ID data. The channel ID is forwarded to an address handler unit of a channel controller and the corresponding data is stored into BMEM.

In some implementations, the data may be a vector of parameters that is stored in a buffer (e.g., a circular buffer) in BMEM. A buffer write pointer is moved every time the fetch ID unit issues a load request to memory. The subsequent pipeline stage increments the read pointer once they have consumed the data in the buffer. The fetch ID unit can stall issuance of a memory 105 load when the buffer does not have enough space for the memory 105 load data to be stored in BMEM. Also, the memory 105 can produce a read-response out of order. The fetch ID unit includes response re-order logic to ensure the channel IDs are sent in-order to the address handler.

The flush processes are implemented using a flush ID unit, such as flush ID unit 602 (or 604) discussed below with reference to FIG. 6. In some implementations, the flush ID unit is an optional third processing stage in a channel controller pipeline. In general, the flush ID unit is used to move data from, for example, a BMEM source address to a memory 105 destination address. The flush ID unit receives the channel ID data structure from an address handler into a FIFO. The channel ID data encodes a length of the data to be retrieved (in 32 Bytes), a TokenID (e.g., destination address of memory 105), and a BMEM source address. Similar to the fetch ID unit, the flush ID unit has the streamlined responsibility of loading the parameters from the BMEM source address (i.e., memory location) and storing it in the destination address (i.e., memory location) of memory 105. Thus, the flush ID unit can be used to write parameters for a neural network layer to any memory location of a high-bandwidth system memory using the OCI interface 500.

The OCI interface 500 can require that all requests be broken-down into 128 Byte (128 B) transfers. In some cases, the requests may be broken-down into 64 B or 128 B transfers depending on an address mode of a processor core implementing the requests. The processor core may be configured to support multiple addressing modes. The address conversion and splitting of transfers into multiple 128 B (or 64 B) requests is done before sending the request out to the OCI interface/crossbar 500.

A sync flag is updated by the flush ID unit after receiving the responses for the stores from memory 105. This allows for loads from subsequent batch processing to consistently see up-to-date data. Since responses can arrive out-of-order, the flush ID unit uses a simple mechanism of comparing a total number of store commands sent with a total number of responses received from the memory 105. The sync flag is updated when the counts match and no additional channel ID data is outstanding.

Figure 6:
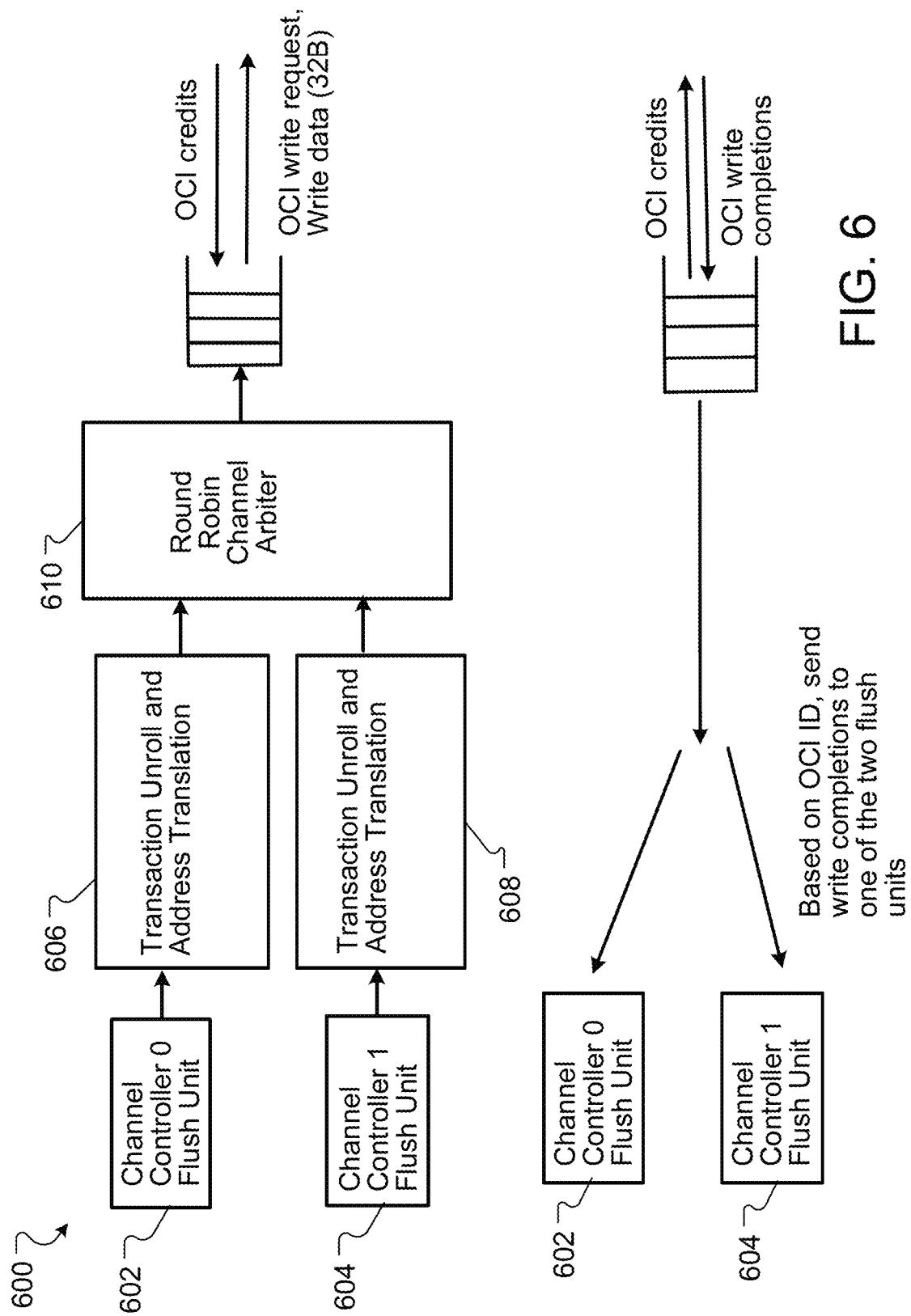
FIG. 6 shows an example flow diagram for a write operation involving an OCI processor node.

FIG. 6 shows an example flow diagram for a write operation 600 involving an OCI processor node. The write operation 600 can include one or more transactions. Each channel controller is connected to memory 105 through an OCI interface and is used to implement a write pipeline for implementing operation 600. Each channel controller includes a respective flush identification (ID) unit that unrolls a transaction associated with a write operation 600. In the example of FIG. 6, a first channel controller 0 includes a flush ID unit 602 ("flush unit 602") and performs one or more unroll and translation operations 606, whereas a second, different channel controller 1 includes a flush ID unit 604 ("flush unit 604") and performs one or more unroll and translation operations 608. In some implementations, channel controller 0 and channel controller 1 are the same channel controller.

Each of flush units 602, 604 can unroll a respective transaction to multiples of 128 B or 64 B depending on channel operating mode of a given processor core that includes the respective channel controllers 0 and 1. For example, as described above, an OCI transaction request encodes addressing information for obtaining data from any memory channel of the system memory using the OCI interface or for writing data obtained from any memory channel to a vector memory of a processor core. Thus, in some implementations, the addressing information is derived from one or more incoming OCI transaction requests received at the OCI controller. Each incoming OCI transaction request can include multiple identifier's (IDs) that correspond to any set of memory locations across any memory channel of the system memory.

The OCI transaction request may be unrolled and/or translated (e.g., broken-down) into 64 B or 128 B transfers depending on an address mode of a processor core implementing the requests. The unrolling of a respective transaction to multiples of 128 B or 64 B can be also aligned to 32 B and sent to the OCI controller 502. As noted above, each processor core of system 100 can operate in a channel-interleaved mode or stack-interleaved mode that each represent an example addressing (or operating) mode of the processor core.

Each OCI controller 502 can communicate with two different flush units, such as flush units 602, 604 or flush units that correspond to one or more other memory channels of memory 105. Based on the requester, the controller 502 assigns an OCI ID to each write request and sends the write request out on a corresponding write interface. For example, the controller 502 can send or transmit the request via a write interface coupled to an example channel 0 or channel 1 by selecting between the two flush units 602, 604 in a round robin manner using example selection logic of a channel arbiter 610. The selection logic can be based on the modified round-robin dispatch algorithm 300, described above. In some implementations, each of flush ID unit 602, 604 is operable to generate a "deallocate" signal to indicate whenever Channel ID data processing is completed. As discussed above, a backward pass may be performed to update an embedding table during a training phase of a neural network machine-learning/data model. The deallocate signal is transmitted to a corresponding fetch ID unit during backward pass operations for parameters.

In some implementations, the operations performed by each of flush units 602, 604 are unaffected by the order in which write operations are completed. Because a given flush unit 602, 604 might not care about the order of write completions, there is no need to use more than two OCI IDs for writes. Thus, the controller 502 can streamline its operations and realize compute savings or efficiency by minimizing operations to assign additional OCI IDs to a write request. In some implementations, the OCI interface 500 can use a bit vector to track an outstanding ID. Depending on the OCI ID for the write completion, the ID is forwarded to the flush unit that generated the transaction where the number of outstanding completions are counted.

Figure 7:
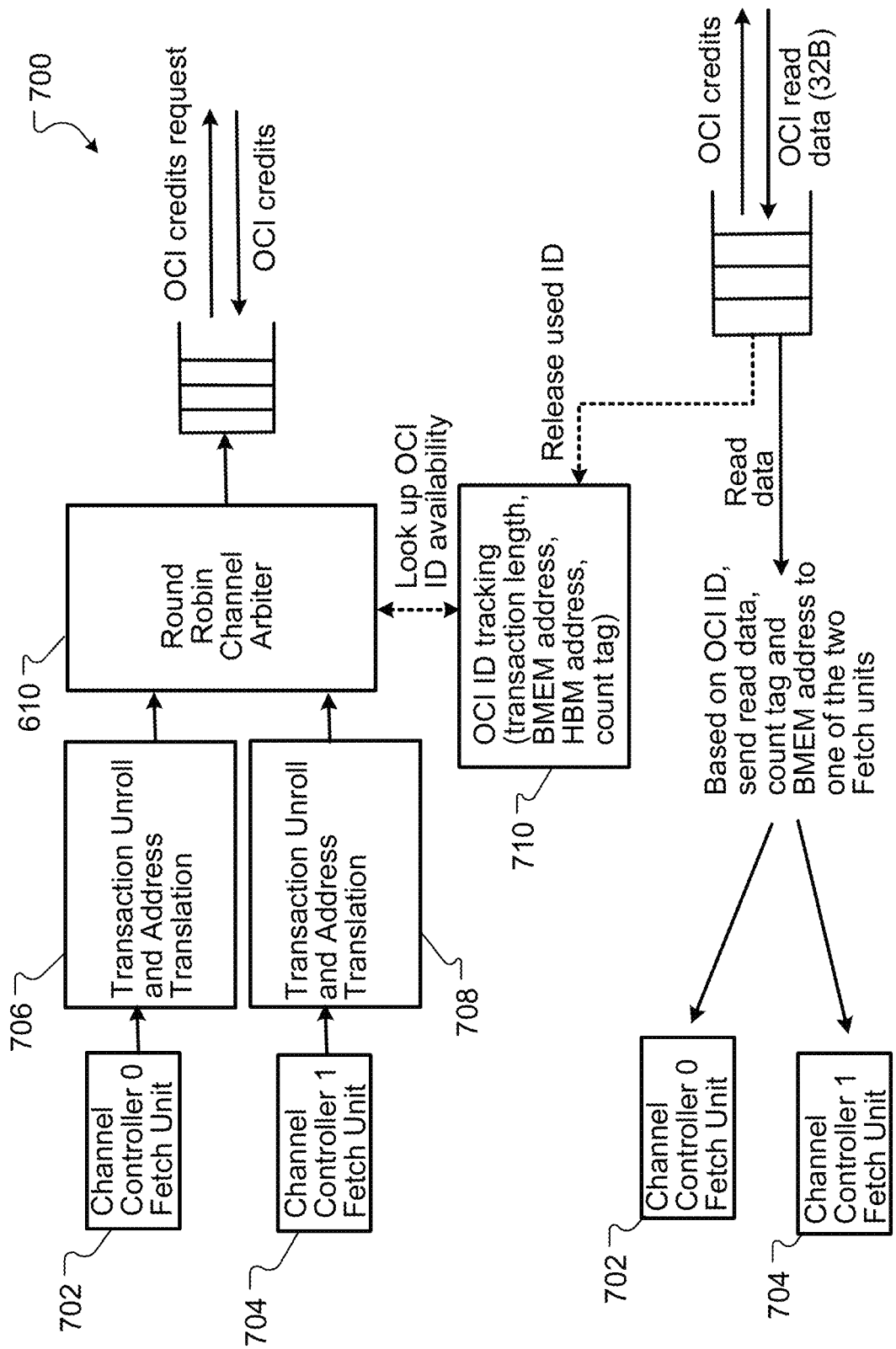
FIG. 7 shows an example flow diagram for a read operation involving an OCI processor node.

FIG. 7 shows an example flow diagram for a read operation 700 involving an OCI processor node.

Each channel controller (e.g., controller 502) includes a respective fetch identification (ID) unit that unrolls a transaction associated with a read operation 700. In the example of FIG. 7, a first channel controller 0 includes a fetch ID unit 702 ("fetch unit 702") and performs unroll and translation operation 706, whereas a second, different channel controller 1 includes a fetch ID unit 704 ("fetch unit 704"). For an example read operation, the transaction unrolling and address translation is done within a corresponding OCI controller 502 after which a request is made to the channel arbiter 610 to send the read request to the OCI. In this example, the OCI controller 502 corresponds to channel controller 0 or channel controller 1.

In some implementations, each fetch unit 702, 704 tracks completion of read operations using a count tag memory and updates a sync flag memory to account for the completion. In some other implementations, a control module that unrolls the transactions is configured to generate at least one 128 B transaction every 4 cycles to match a rate at which read data can be accepted. The channel arbiter 610 serves to two channel controllers in a round robin fashion and looks up available IDs in a tag tracking table 710. For example, the tracking table can hold one entry per ID and can include 256 entries. In some implementations, the tracking table can be configured to hold more or fewer entries. In the example of 256 entries, lines 0-127 of the table may be reserved for fetch unit 702 and lines 128-255 of the table may be reserved for fetch unit 704.

Depending on the requester fetch unit, the channel arbiter 610 can perform a look up to determine a region of the table that includes one or more available IDs. The IDs can be allotted in an incrementing manner. For example, once ID0 is allocated, it will not be allocated again until ID127 has been allocated, even if the read data for ID0 has been returned. This configuration streamlines implementation of the table and provides availability of 128 IDs per channel controller in a manner that reduces or eliminates a likelihood that the OCI will experience a lack of IDs. In some implementations, each entry in the tag tracking table holds 32 B for a memory address of the least significant 32 B of the transaction, 13 B for a BMEM address where the data is to be written to, 2 B indicating a transaction length (multiples of 32 B), 5 B for a count tag that was received from fetch unit to track the completion (possibly larger) transaction, and 1 B for cache to mark whether this transaction is cacheable in a read bypass buffer. In some cases, the least significant 32 B of the transaction is required for writing to the read bypass buffer.

The read data from the OCI interface 500 can be sent over 1-4 cycles depending on the size of the transaction into a FIFO. The writing of the 1st 32 B line of the transaction into this FIFO triggers a lookup to the tag table to retrieve the BMEM address, HBM address and count tag attached to this data. The transaction can include a cache enable bit. If the cache enable bit for this transaction is set to 0 in the table 710, then there is no update made to the read bypass buffer and the ID is deallocated. If the cache bit is set to 1, then the data is written to the read bypass buffer.

Evictions in the read bypass buffer can happen in FIFO order, where the least significant 32 B of a transaction is written first. This combined with the fact that the HBM address match list is looked up with the least significant 32 B of a transaction will ensure that if the lower 32 B of a transaction causes a "hit," the remaining bytes of the transaction can also exist in the buffer. The data being looked up from a fetch unit 702, 704 is such that accesses to a specific HBM address will be the same length, which causes each transaction to that specific HBM address to be unrolled in the same way. This implementation detail avoids a scenarios that cause "hits" on only a portion of a transaction in the read bypass buffer.

The memory 105 address from the tag table 710 can be added to the match list and the corresponding data updated in the buffer by arbitrating for the write port across writes from each of the four channel OCI controllers. To avoid the risk of evicting an entry that was "hit" in the memory 105 address list, memory addresses that are located close to the next candidate for eviction may be marked as "miss." In some cases, this is because there is an arbitration delay between the actual hit and the time taken to read the data out of a bypass buffer.

Depending on the architecture layout of the integrated circuit, there could be some difference in delays between overwriting the various copies of the HBM address match list and the bypass buffer. In some implementations, the system 100 includes a control parameter that defines the threshold for how close a hit should be to an eviction candidate to be marked as a miss. The memory 105 address lists can be replicated across the channel OCI controllers to avoid the need for arbitrating to determine whether an entry exists in the bypass buffer or not. The system 100 may be configured such that some (or all) entries in the read bypass buffer are invalidated between batches to ensure that the system does not use stale data. The invalidation request to this bypass buffer may be sent along with the last ID in the batch from the fetch unit.

The read data, either from OCI or the bypass buffer, is sent out to the BMEM in 32 B lines along with the BMEM address to which it has to be written. As noted above, the corresponding fetch unit (e.g., fetch unit 702 or 704) tracks read completions using the count tag memory and performs an update of the sync flag memory.

One or more transactions may be marked as non-cacheable and sent out to another round robin channel arbiter 610 that selects between these transactions and any cacheable transactions that had a lookup miss. A grant provided by this channel arbiter is based on the available credits indicated at the OCI interface.

A transaction that is marked cacheable may be sent into a separate FIFO queue or table for looking up the memory 105 addresses present in a read bypass buffer. The system 100 performs address matching by searching, for example, 512 entries in parallel for the memory 105 addresses for the least significant 32 B of the transaction. In some implementations, the system 100 can include 4 channel OCI controllers that each have its own copy of the list of memory 105 addresses present in the bypass buffer which is shared across all 4 controllers. An update to the bypass buffer can result in all the copies of the addresses being updated. In case of a hit in the list of addresses, the transaction has to arbitrate with transactions from the other 3 controllers to access the read data.

In some implementations, the OCI ID that was allocated to this transaction is released and the transaction is queued for the read data lookup. The read data from this bypass buffer is queued to be sent back to the fetch unit that the request originated from, and this may be retrieved from the most significant bit of the OCI ID that was initially allocated to this transaction. This sending of the read data is performed through a round robin arbiter that selects between the data from the OCI interface 500 and the data from the bypass buffer.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An integrated circuit configured to accelerate machine-learning computations, the circuit comprising:
   a plurality of processor cores, each processor core comprising:
      a plurality of channel controllers;
      an interface controller configured to couple each of the plurality of channel controllers to each memory channel of a system memory; and
      a respective fetch unit in each of the plurality of channel controllers, the respective fetch unit being configured to:
         i) receive a request that encodes addressing information;
         ii) obtain, based on the addressing information, data from any memory channel of the system memory using the interface controller; and
         iii) write the data obtained from any memory channel to a vector memory of the processor core via the channel controller that includes the fetch unit.

2. The integrated circuit of claim 1, wherein the interface controller is operable to control:
   an intra-memory OCI node that includes:
      i) a plurality of read interfaces that are used to obtain data from any memory location along any memory channel of the system memory; and
      ii) a plurality of write interfaces that are used to write data to any memory location along any memory channel of the system memory.

3. The integrated circuit of claim 2, wherein the intra-memory OCI node comprises:
   a first in, first out (FIFO) memory queue configured to store incoming OCI transaction requests during arbitration of an existing OCI transaction for: i) obtaining data from any memory location of the system memory or ii) writing data to any memory location of the system memory.

4. The integrated circuit of claim 3, wherein the interface controller is configured to:
   receive the request that encodes the addressing information;
   generate a plurality of control signals based on a plurality of IDs in the addressing information; and
   provide the plurality of control signals to any memory channel of the system memory to fetch a data stored in a memory location of the system memory.

5. The integrated circuit of claim 4, wherein:
   the addressing information is derived from one or more incoming OCI transaction requests received at the interface controller; and
   at least one existing OCI transaction request for accessing any memory location of the system memory was previously stored in the FIFO memory queue.

6. The integrated circuit of claim 5, wherein:
   each incoming OCI transaction request comprises a plurality of identifier's (IDs) corresponding to any set of memory locations across any memory channel of the system memory.

7. The integrated circuit of claim 6, wherein:
   the OCI interface includes two or more addressing modes; and
   the interface controller is operable to generate control signals that allow for selecting between the two or more addressing modes of the interface controller.

8. The integrated circuit of claim 7, wherein:
   a first addressing mode of the two or more addressing modes is a channel-interleaved mode that constrains a mapping of an embedding table relative to memory channels of the system memory.

9. The integrated circuit of claim 8, wherein:
   a second addressing mode of the two or more addressing modes is a stack-interleaved mode that expands the mapping of the embedding table relative to memory channels of the system memory.

10. The integrated circuit of claim 7, wherein each OCI transaction request is:
    received by the fetch unit; and
    processed, by the interface controller, to initiate accessing any memory location indicated in the OCI transaction request.

11. The integrated circuit of claim 10, wherein each OCI transaction request for accessing data stored in the system memory encodes:
    i) a length in 32 Bytes corresponding to the data being accessed;
    ii) a TokenID that represents a source address specific to any memory location in system memory; and
    iii) a destination address of a memory location of the vector memory.

12. The integrated circuit of claim 8, wherein:
    the embedding table is split-up as multiple data shards that are allocated across memory channels of the entire system memory; and
    the interface controller selects the stack-interleaved mode to access any portion of the embedding table using any one of the plurality of channel controllers.

13. The integrated circuit of claim 1, further comprising:
    a respective flush unit in each of the plurality of channel controllers, the respective flush unit being configured to:
    i) receive a request that encodes addressing information;

ii) write, based on the addressing information, data from a source address in the vector memory to any memory location of the system memory using the interface controller.

14. The integrated circuit of claim 13, wherein:
the machine-learning computations are performed to process neural network inputs through a neural network layer; and
the flush unit is used to write parameters for the neural network layer to any memory location of the system memory using the interface controller.

15. A computer-implemented method performed using an integrated circuit configured to accelerate machine-learning computations, the integrated circuit comprising a system memory and a processor core that includes a plurality of channel controllers, the method comprising:
receiving a plurality of requests, where each of the plurality of requests encodes addressing information;
for a first request of the plurality of requests:
identifying, based on addressing information of the first request, any memory location of any memory channel of the system memory;
obtaining data from a memory location among any memory location of the system memory using an on-chip interconnect (OCI) interface that couples each of the plurality of channel controllers to each memory channel of the system memory; and
writing, based on the addressing information of the first request, the data obtained from the memory location to a vector memory of the processor core.

16. The method of claim 15, wherein:
the OCI interface comprises an intra-memory OCI node that includes a plurality of read interfaces and a plurality of write interfaces; and
the method further comprises:
obtaining, based on control signals generated by an interface controller, data from any memory location along any memory channel of the system memory using the plurality of read interfaces; and
writing, based on control signals generated by the interface controller, data to any memory location along any memory channel of the system memory using the plurality of write interfaces.

17. The method of claim 16, wherein the intra-memory OCI node comprises a first in, first out (FIFO) memory queue and the method comprises:
storing, at the FIFO memory queue, incoming OCI transaction requests during arbitration of an existing OCI transaction for: i) obtaining data from any memory location of the system memory or ii) writing data to any memory location of the system memory.

18. The method of claim 17, further comprising:
receiving, by the interface controller, the request that encodes the addressing information;
generating, by the interface controller, a plurality of control signals based on a plurality of IDs in the addressing information; and
providing, by the interface controller, the plurality of control signals to any memory channel of the system memory to fetch a data stored in a memory location of the system memory.

19. The method of claim 18, wherein:
the addressing information is derived from one or more incoming OCI transaction requests received at the interface controller; and
at least one existing OCI transaction request for accessing any memory location of the system memory was previously stored in the FIFO memory queue.

20. The method of claim 19, wherein:
each incoming OCI transaction request comprises a plurality of identifier's (IDs) corresponding to any set of memory locations across any memory channel of the system memory.

* * * * *